3,563,937
Patented Feb. 16, 1971

3,563,937
MONOVINYLIDENE AROMATIC HYDROCARBONS-HALF ESTERS OF UNSATURATED DICARBOXYLIC ACIDS OR ANHYDRIDES AS RESINOUS BINDERS FOR PRINTING INKS
Ralph F. Nickerson, West Springfield, Mass., assignor to Monsanto Company, St. Louis, Mo., a corporation of Delaware
No Drawing. Filed Mar. 20, 1968, Ser. No. 714,458
Int. Cl. C08f 19/10, 41/06, 45/34
U.S. Cl. 260—33.4          7 Claims

ABSTRACT OF THE DISCLOSURE

An ink for a steam-set printing process comprising a organic solvent such as diethylene glycol, triethylene glycol and mixtures thereof, a pigment, and a resinous binder comprising half-esters of styrene-maleic anhydride copolymers which are soluble in the solvent but insolube in water. The ink is used in a steam-set printing process whereby the binder and pigment are caused to precipitate on a porous surface by the action of water or water vapor.

BACKGROUND OF THE INVENTION

(1) Field of the invention

This invention relates to resinous binders for use in printing inks of the steam-set type.

(2) Description of the prior art

As is well known a printing ink is fundamentally a mixture of coloring matter and a binder dispersed or dissolved in an appropriate solvent. The binder carries the colorant during the printing operation and acts as an adhesive between the colorant and the substrate.

Printing inks may, in general, be divided into four classes, i.e., letterpress, lithographic, flexographic and rotogravure. All contain the binders and colorants referred to above and, depending upon the particular application, a particular binder may be usuable in one or more of the major classes.

A printing ink may also be further classified with regard to the method by which it is dried. One category known as the steam-set inks dry by precipitation of the resinous binder which, of course, carries with it the colorant. This type is of particular commercial importance in the printing of containers, boxes, bags and wrappers of various kinds. Such team-set inks require binders which are soluble in alcohols, but which are insoluble in water. These binders are dissolved in a particular alcohol, usually diethylene glycol or triethylene glycol and are then applied to the substrate to be printed. The coated substrate is then contacted with water, generally in the form of steam, which mixes with the water-miscible alcohol solvent, carrying the alcohol into the body of the substrate and leaving behind a precipitate of water insoluble resin and colorant in the form of printed matter.

It is thus apparent that a binder to be used in such an application must be one of a highly specialized nature. It must, first of all, have the ability to adhere both to the substrate to be printed and also to the colorant. Further, it must be soluble in an alcohol which is miscible with water and must itself, at the same time, be insoluble in water. In addition to this, it must, of course, exhibit the proper rheological properties necessary for utility in a printing ink. In particular, it should have a low viscosity and a low yield value, i.e., the ability to flow under a low stress.

In the past, zein has been used almost universally in this application. Zein, however, being a natural product, varies widely in its physical properties, making quality control and uniformity of the finished printing inks difficult. Further, zein is no longer commercially available in this country and therefore a great demand and need has arisen for a binder capable of taking its place. The demand is especially great for a binder based upon a synethetic resin so that the uniformity which has always been lacking in the previously used natural product may be assured.

SUMMARY OF THE INVENTION

This invention relates to the use of copolymer esters, particularly half-esters of styrene-maleic anhydride copolymers, as binders for use in inks for steam-set printing.

More particularly, this invention relates to an improvement in a printing ink for steam-set printing wherein the ink comprises:

(A) at least one water-miscible organic solvent,
(B) coloring matter distributed throughout the organic solvent and
(C) at least one resinous binder dissolved in the organic solvent; wherein the improvement comprises including as at least one of the binders a resinous material comprising an interpolymer of:
(D) at least one monovinylidene aromatic hydrocarbon and
(E) at least one ester of an ethylenically unsaturated dicarboxylic acid or anhydride thereof;

wherein each mole of dicarboxylic acid or anhydride present in the interoplymer has been esterified by reaction with at least one mole of an alcohol containing 1–20 carbon atoms.

DESCRIPTION OF THE PREFERRED EMBODIMENTS

The binder of this invention is based upon a copolymer of a monovinylidene aromatic compound and an ethylenically unsaturated dicarboxylic acid or anhydride thereof. The copolymer is esterified with an alcohol containing 1–20 carbon atoms. It is critical to the invention that at least one mole of alcohol be used for every mole of dicarboxylic acid or anhydride present in the copolymer. That is to say, every dicarboxylic acid or anhydride molecule in the polymer chain must be at least half-esterified. If such is not the case, gelling will result rendering the ink unfit for use.

Thus, in the practice of this invention, the binder employed in the printing ink is a partial ester of a copolymer of a vinylidene aromatic compound and an ethylenically unsaturated dicarboxylic acid, or anhydride thereof.

As stated previously, the ester portion of the copolymer can be any organic radical of 1–20 carbon atoms and may consist of carbon and hydrogen with or without oxygen, nitrogen and other elements. It is preferably selected from the group consisting of alkyl, aryl, aralkyl and cycloalkyl radicals. Particularly useful are the alkyl radicals usch as methyl, ethyl, propyl, butyl, dodecyl, etc.; the aromatic radicals such as benzyl, etc.; the ether radicals such as butoxyethyl, propoxyethyl, furfuryl, methyl ether of diethylene glycol, methyl ether of triethylene glycol, thioethers, etc.; the amino radicals such as dimethyl amino ethyl, etc; and the cycloalkyl radicals such as cyclohexyl, cyclopentyl, etc.

The vinylidene aromatic compounds which may be polymerized with an ethylenically unsaturated dicarboxylic acid or anhydride include such compounds as styrene, alpha-methyl styrene, vinyl toluene, vinyl xylene, 2,4-dimethyl styrene, o-, m-, and p-chlorostyrene, 2,5-dichlorostyrene, 2-methyl-4-chlorostyrene, vinyl naphthalene and alpha cyanostryrene, etc.

The ethylenically unsaturated dicarboxylic acid or anhydride may be for example, maleic acid, maelic anhydride, fumaric acid, glutaconic acid, alpha-hydromuconic acid, beta-hydromuconic acid, citraconic, itaconic, etc. Especially preferred copolymer esters to be used as the binders of this invention are the n-propyl, isobutyl and 2-butoxyethyl half-esters of a 1:1 copolymer of styrene and maleic anhydride. Primarily the reason that these particular esters are preferred is that they have been found to exhibit the requisite solubility in triethylene glycol or diethylene glycol, the solvents which are presently used by the printing industry in the steam-set process and which are readily available commercially.

Other water-miscible solvents in which the binder is soluble may also be used, of course, as the printing ink solvent. Among those utilizable are 2-butoxyethanol, ethoxy ethanol, sec-butyl alcohol, isopropanol, ethanol, methyl ethyl ketone, acetone, etc. The preferred solvents are, of course, the triethylene glycol and diethylene glycol described above.

It is essential that the resinous binder of this invention be of a low molecular weight. The consequent low viscosity is necessary in order to ensure the proper flow properties of the ink and to optimize the attendant rheological properties. In particular, it is highly desirable to formulate the ink with as high a solids content as possible since a high colorant content is thereby achievable. This has the advantage of producing printed copy having strong, vivid and attractive tones. However, high solids content coupled with high molecular weight yields a viscous ink having poor flow properties and consequently little or no utility. Therefore, in order to achieve an ink of the requisite low viscosity and high solids content, a low molecular weight binder is required. In practice, a molecular weight range of 1000–20,000 achieves these optimal characteristics and is preferred.

It has been the practice in the industry to use readily available products such as nitrocellulose and/or fumarated rosin as extenders and cobinds in the heretofore-used Zein system. This practice may be continued with the resinous binders of the present invention, thereby providing, particularly with fumarated rosin, the advantage of low cost coupled with little or no decrease in desirable physical properties.

The following examples are presented in illustration of this invention are are not intended as limitations thereof. Where parts are mentioned, parts by weight are intended unless otherwise designated.

EXAMPLE 1

280 grams of the isobutyl half-ester of a 1:1 copolymer of styrene and maleic anhydride are dissolved in 320 grams of triethylene glycol. In a separate vessel 80 grams of ¼ sec. SS nitrocellulose (70%) are dissolved in 260 grams of triethylene glycol. The two solutions are heated to 80° C. and combined. Thereafter another 100 grams of triethylene glycol is added. The resulting solution has an active solids content of 29.4% and a Brookfield viscosity at 27° C. of 3500 cps.

EXAMPLE 2

As a control, a 24% solids solution in triethylene glycol of a 5:1 mixture of Zein and nitrocellulose is prepared. This is the binder that is currently used commercially in the steam-set process. It is found that at 27.5° C. this solution has a Brookfield viscosity of 10,800 cps. It will be noted that the resin solution of the present invention, i.e., that of Example 1, has a viscosity only about ⅓ that of the commercial system. It will also be noted that the solids content of the solution of the present invention is approximately 20% higher than that of the control. This particularly points out an advantage to be gained by the substitution of a synthetic binder for a binder based upon a natural product, i.e., the molecular weight, and thus the viscosity, of the synthetic resin can be controlled, whereas the molecular weight of a natural product cannot.

EXAMPLE 3

To 15 parts of the solution prepared in Example 1 is added 35 parts of a 30% solution of fumarated rosin in triethylene glycol. To this mixture are further added 25 parts titanium dioxide, 3 parts alkali blue, 9 parts iron blue, 10 parts of a hydrocarbon wax compound, and 3 parts of triethylene glycol. The mixture thus prepared is poured into a ball mill and milled overnight. The ink thus prepared is applied to boxboard by standard letterpress techniques. The colored boxboard is then treated with steam which penetrates into the paper substrate matrix carrying with it the triethylene glycol solvent and thereby precipitating the resinous binder and pigments on the boxboard surface.

EXAMPLE 4

Example 3 is repeated except that 50 parts of the solution of Example 1 is used and the fumarated rosin is omitted. The resulted obtained thereby are equivalent to those of Example 3.

EXAMPLE 5

112 grams of the 2-butoxyethanol half-ester of a 1:1 styrene maleic anhydride copolymer are dissolved in 128 grams of triethylene glycol by heating to 175° C. Another 80 grams of triethylene glycol are added yielding a solution having a solids content of 35%. The resin used has a molecular weight of about 1500 and the solution thus prepared has a Brookfield viscosity at 27° C. of 9820 cps. This solution is substituted for the binder solution of Example 4 and is found to be essentially equally useful.

EXAMPLE 6

Example 3 is repeated except that the n-propyl half-ester of a 1.4:1 styrene: maleic anhydride copolymer is substituted as the binder. Again, upon applying the ink to boxboard and treating with steam, the binder and pigments are precipitated on the boxboard surface and the solvent is carried into the paper matrix.

It will be obvious, of course, that many variations may be made in the compositions and processes set forth herein without departing from the essential spirit and scope of this invention.

What is claimed is:

1. A printing ink for steam-set printing consisting essentially of:
   (A) an organic solvent selected from the group consisting of diethylene glycol, triethylene glycol and mixtures thereof,
   (B) pigment distributed throughout the organic solvent, and
   (C) a resinous binder component dissolved in the organic solvent, one interpolymer of:
      (1) A monovinylidene aromatic hydrocarbon and
      (2) An ester of an ethylenically unsaturated dicarboxylic acid or anhydride thereof,
wherein each mole proportion of dicarboxylic acid or anhydride present in the interpolymer has been esterified by reaction with at least one mole proportion of an alcohol containing 1–20 carbon atoms said alcohols being selected such that they yield half-ester products which are soluble in said glycols but insoluble in water; and wherein the molecular weight of the interpolymer is in the range of from 1000 to 20,000.

2. The printing ink of claim 1 wherein the monovinylidene aromatic hydrocarbon is styrene.

3. The printing ink of claim 1 wherein the ethylenically unsaturated dicarboxylic anhydride is maleic anhydride.

4. The printing ink of claim 1 wherein the alcohol containing 1–20 carbon atoms is selected from the group consisting of n-propanol, isobutanol, 2-butoxyethanol and mixtures thereof.

5. The printing ink of claim 1 wherein the monovinylidene aromatic hydrocarbon and the ester of an ethylenically unsaturated dicarboxylic acid or anhydride are present in an molar ratio of 1:1.

6. A printing ink for steam-set printing consisting essentially of:
(A) an organic solvent selected from the group consisting of diethylene glycol, triethylene glycol and mixtures thereof,
(B) pigment distributed throughout the organic solvent, and
(C) a resinous binder component dissolved in the organic solvent, wherein the binder comprises at least one interpolymer of:
(1) styrene, and
(2) an ester of maleic anhydride;
wherein each mole proportion of maleic anhydride in the interpolymer has been esterified by reaction with at least one mole proportion of an alcohol selected from the group consisting of n-propanol, isobutanol, 2-butoxyethanol and mixtures thereof; and where in the molecular weight of the interpolymer is in the range of from 1000 to 20,000.

7. The printing ink of claim 6 wherein the ratio of styrene to the ester of maleic anhydride is in the range of 1:1 to 1.4:1.

References Cited

UNITED STATES PATENTS

| | | | |
|---|---|---|---|
| 2,320,724 | 6/1943 | Gerhart et al. | 260—78.5 |
| 2,537,018 | 1/1951 | Barrett | 260—17 |
| 2,967,162 | 1/1961 | Vasta | 260—78.5 |
| 3,216,885 | 11/1965 | Schaufelberger | 260—78.5 |
| 3,342,764 | 9/1967 | Varron et al. | 260—22 |
| 3,342,787 | 9/1967 | Muskat | 260—78.5 |
| 2,047,398 | 7/1936 | Voss et al. | 260—78.5 |
| 3,028,349 | 4/1962 | Rowland et al. | 260—24 |
| 3,053,779 | 9/1962 | O'Neill | 260—17.5 |
| 3,472,802 | 10/1969 | Bownes et al. | 260—13 |

WILLIAM H. SHORT, Primary Examiner

L. M. PHYNES, Assistant Examiner

U.S. Cl. X.R.

106—26; 260—17, 27, 37, 78.5

PO-1050
(5/69)

UNITED STATES PATENT OFFICE
CERTIFICATE OF CORRECTION

Patent No. 3,563,937　　　　　　　　Dated February 16, 1971

Inventor(s) Ralph F. Nickerson

It is certified that error appears in the above-identified patent and that said Letters Patent are hereby corrected as shown below:

Column 3, line 39, "cobinds" should read --- cobinders ---.

Column 4, line 56, after the comma (,), insert --- wherein the binder comprises at least ---.

Signed and sealed this 1st day of June 1971.

(SEAL)
Attest:

EDWARD M. FLETCHER, JR.　　　　　　WILLIAM E. SCHUYLER, JR.
Attesting Officer　　　　　　　　　Commissioner of Patents